Patented May 24, 1932

1,859,786

UNITED STATES PATENT OFFICE

RICHARD MULLER, OF MANNHEIM, AND FRITZ VOELLER, OF HEIDELBERG, GERMANY, ASSIGNORS TO C. F. BOEHRINGER & SOEHNE G. M. B. H., OF MANNHEIM-WALDHOF, GERMANY

PRODUCTION OF ANHYDRIDES OF THE LOWER FATTY ACID SERIES

No Drawing. Application filed May 29, 1930, Serial No. 457,532, and in Germany November 1, 1928.

Our invention refers to the production of chemical compounds and more especially the anhydrides of fatty acids such as for instance acetic acid anhydride, acetaldehyde being recovered in the reaction as a by-product.

It is an object of our invention to provide means whereby these compounds can be obtained in a particularly efficient and economical manner.

Our invention is based on the discovery that the compound having the formula $$CH_3.CH(OCOCH_3).O.CH(OCOCH_3).CH_3$$

which may be termed $\alpha, \alpha'$-diaceto-diethyl ether or bis-($\alpha$-acetoxy-ethyl) ether, when heated in the presence of a dehydration catalyst, such as zinc chloride, stannous chloride or their equivalents, is decomposed under the formation of 2 mols. acetaldehyde and 1 mol. acetic acid anhydride. The reaction is essentially a dehydration.

The compound mentioned above can easily be obtained by reacting with a salt of acetic acid or with the free acid on $\alpha, \alpha'$-dichloro-diethyl ether which is readily formed from 2 mols. acetaldehyde and 2 mols. hydrochloric acid. This reaction thus allows converting acetic acid or the salts thereof by means of hydrochloric acid into acetic acid anhydride, hydrochloric acid and metal chlorides being formed as by-products, the latter acid being available for the production of $\alpha$-$\alpha'$-dichloro ethylether from acetaldehyde.

Obviously, if it is for instance contemplated to produce acetic acid anhydride and acetaldehyde, one need not start from pure diaceto-diethyl ether. One may also decompose directly the crude product of reaction between acetic acid and dichloro diethylether, or the product of reaction between the acetate and the dichloro-diethyl ether in proportion as it is formed, and separate the products of decomposition by distillation, preferably in vacuo.

While acetic acid anhydride has been mentioned specifically, the new method is equally applicable to the production of the anhydrides of other fatty acids.

Fair yields are obtained and those quantities of the starting products, which have not entered into reaction, may be used in a subsequent operation.

In the practice of our invention we prefer proceeding for instance as follows:

Example 1

143 grams $\alpha, \alpha'$-dichloro-diethyl ether are allowed to stand during several days at ordinary temperature with anhydrous alkali metal acetate in excess. The liquid is filtered and there are added 100 grams deca-hydro-naphthalene and 0.25 grams zinc chloride in 5 ccms. acetone. The mixture is now heated, the acetaldehyde, which forms therein, being separated by distillation. The acetic acid anhydride formed in the reaction, being insoluble at ordinary temperature in deca-hydronaphthalene, will separate out as a separate layer, when the reaction mixture is cooled to ordinary temperature, and is purified by distillation. There are obtained 44.1% of the calculated quantity.

Example 2

143 grams $\alpha$-$\alpha'$-dichloro diethyl ether are heated on the water bath together with 120 grams glacial acetic acid and 300 grams anhydrous benzene to a temperature slightly below 80° C. and are maintained at this temperature during 4–5 hours. The quantity of hydrochloric acid which corresponds to the conversion into $\alpha$-$\alpha'$-diaceto diethyl ether, is split off quantitatively and escapes as a vapor. After the reaction has come to an end, the benzene is removed by distillation, 0.25 grams zinc chloride in 10 ccms. glacial acetic acid are added and the temperature is raised to the boiling point of the glacial acetic acid, when the ester is gradually decomposed and the acetaldehyde, which is formed, distils over. After the aldehyde has been removed, the temperature is raised further and the acetic acid anhydride is driven over also. The yield of anhydride is 75% of the calculated quantity.

Example 3

500 grams $\alpha, \alpha'$-diaceto-diethyl ether are mixed with 0.5 grams zinc chloride in 5 ccms. glacial acetic acid and the mixture is heated. At about 110–115° the decomposition of the ether and the separation of the acetaldehyde by distillation begins. Preferably the temperature is regulated in such manner that the acetic acid anhydride forming in the reaction passes over together with the acetaldehyde, the two products of decomposition being separated from each other and from the small quantity of by-products which may be formed by fractional distillation. The yield is about 75% of the calculated quantity.

*Example 4*

500 grams $\alpha, \alpha'$-diaceto-diethyl ether and 0.5 grams zinc chloride in 5–10 ccms. alcohol are dissolved in 300 grams decahydronaphthalene and the mixture is heated until the acetaldehyde and acetic acid anhydride distil off. The products of decomposition may be isolated as described with reference to Example 3. There are obtained about 67% of the calculated quantity.

*Example 5*

500 grams $\alpha, \alpha'$-diaceto-diethyl ether are heated under reduced pressure with 0.5 grams stannous chloride in 5 ccms. acetone at a pressure of about 100–105 millimetres mercury column. The products of distillation (acetaldehyde and acetic acid anhydride) distil over at about 75° C. They may be separated and purified as described with reference to Example 3, the yield is about 75% of the calculated quantity.

*Example 6*

500 grams $\alpha, \alpha'$-dipropio-diethyl ether and 0.5 grams zinc chloride in 5–10 ccms. alcohol are heated and at about 110° C. decomposition of the ether begins. The products of decomposition (acetaldehyde and propionic acid anhydride) are separated by fractional distillation. There are obtained about 60% of the calculated quantity.

Various changes may be made in the details disclosed in the foregoing specification without departing from the invention or sacrificing the advantages thereof.

In the claims affixed to this specification no selection of any particular modification of the invention is intended to the exclusion of other modifications thereof and the right to subsequently make claim to any modification not covered by these claims is expressly reserved.

Our process is applicable for producing the anhydrides of members of the lower fatty acid series, such as acetic and propionic acid anhydrides.

We claim:

1. In the manufacture of fatty acid anhydrides, the process which comprises reacting an $\alpha, \alpha'$-dihalogeno-diethyl ether with a compound having the formula R.COOM, wherein R represents one of the lower members of the group —$C_nH_{2n+1}$ and M represents a replaceable alkali metal atom or hydrogen, to form the corresponding $\alpha, \alpha'$-diacido-diethyl ether, and decomposing the resulting reaction product to form the anhydride corresponding to the fatty acid of formula R.COOH, wherein R has its former significance.

2. The process of claim 1 wherein R represents —$CH_3$ or —$C_2H_5$.

3. The process of claim 1 wherein M represents an alkali metal.

4. The process of claim 1 wherein said decomposition is accomplished with the aid of a dehydration catalyst.

5. The process of claim 1 wherein said decomposition is accomplished with the aid of a catalyst selected from a group consisting of zinc chloride and stannous chloride.

6. The process of claim 1 wherein the $\alpha, \alpha'$-dihalogeno-diethyl ether is $\alpha, \alpha'$-dichloro-diethyl ether.

7. The process of claim 1 wherein said decomposition takes place in the presence of an inert diluent.

8. The process of claim 1 wherein the products of said decomposition are separated by distillation.

9. The process of claim 1 wherein the said decomposition is conducted under a pressure below atmospheric.

10. The process of claim 1 wherein M represents hydrogen.

In testimony whereof we affix our signatures.

RICHARD MULLER.
FRITZ VOELLER.